(12) United States Patent
Tuel

(10) Patent No.: US 7,783,763 B2
(45) Date of Patent: Aug. 24, 2010

(54) MANAGING STATEFUL DATA IN A PARTITIONED APPLICATION SERVER ENVIRONMENT

(75) Inventor: Anthony Ryan Tuel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 11/422,496

(22) Filed: Jun. 6, 2006

(65) Prior Publication Data

US 2007/0282979 A1    Dec. 6, 2007

(51) Int. Cl.
    *G06F 15/16* (2006.01)
(52) U.S. Cl. .................. 709/228; 709/201; 709/203; 709/227; 709/229
(58) Field of Classification Search .................. 709/227, 709/228, 229, 201, 203
    See application file for complete search history.

(56) References Cited

U.S. PATENT DOCUMENTS

| | | | |
|---|---|---|---|
| 6,598,077 B2 | 7/2003 | Primak et al. | |
| 7,197,547 B1 * | 3/2007 | Miller et al. | 709/223 |
| 2003/0037108 A1 | 2/2003 | Peiffer et al. | |
| 2004/0249984 A1 | 12/2004 | Das et al. | |
| 2005/0021848 A1 | 1/2005 | Jorgenson | |
| 2005/0050084 A1 * | 3/2005 | Atm | 707/102 |
| 2005/0091319 A1 * | 4/2005 | Kirsch | 709/206 |
| 2005/0203994 A1 | 9/2005 | Palmer et al. | |
| 2006/0179113 A1 * | 8/2006 | Buckingham et al. | 709/206 |

* cited by examiner

*Primary Examiner*—Djenane M Bayard
(74) *Attorney, Agent, or Firm*—Patents On Demand, P.A.; Brian K. Buchheit

(57) ABSTRACT

A computer implemented method for managing a request for processing of stateful requests in a partitioned application server environment. A request is received from a client at the partitioned application server environment to form a received request. An application server in a plurality of application servers is identified in the partitioned application server environment based on the received request to form an identified application server. The received request is sent to the identified application server. Stateful data is migrated for use by application servers in the plurality of application servers.

16 Claims, 9 Drawing Sheets

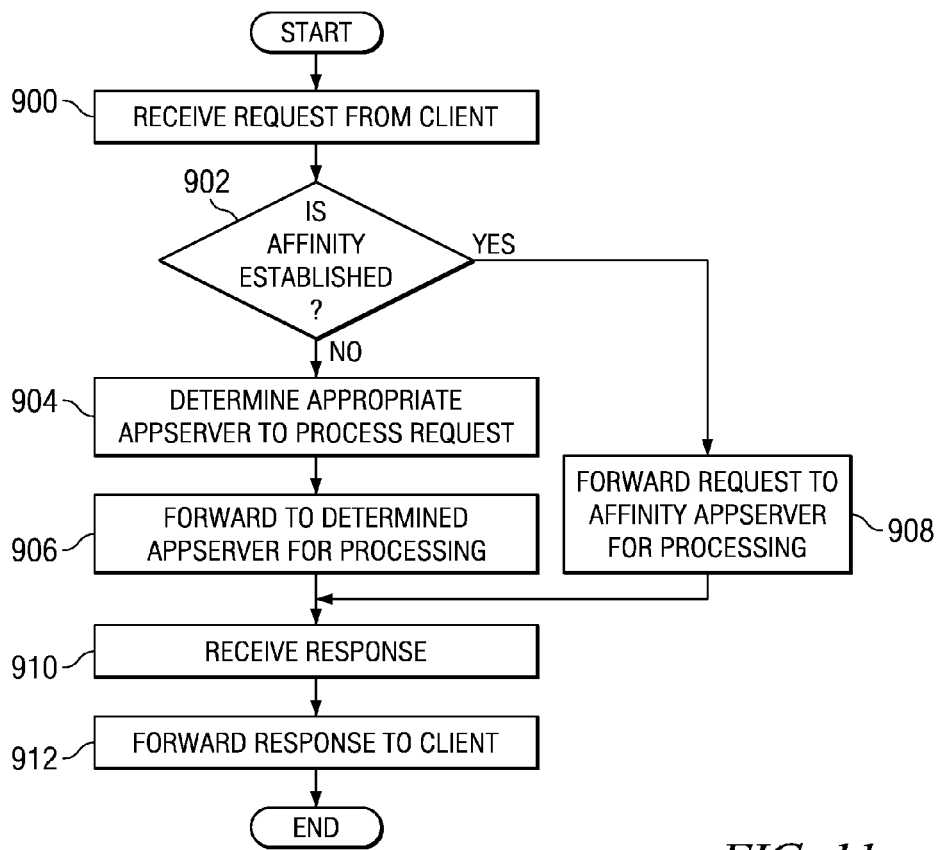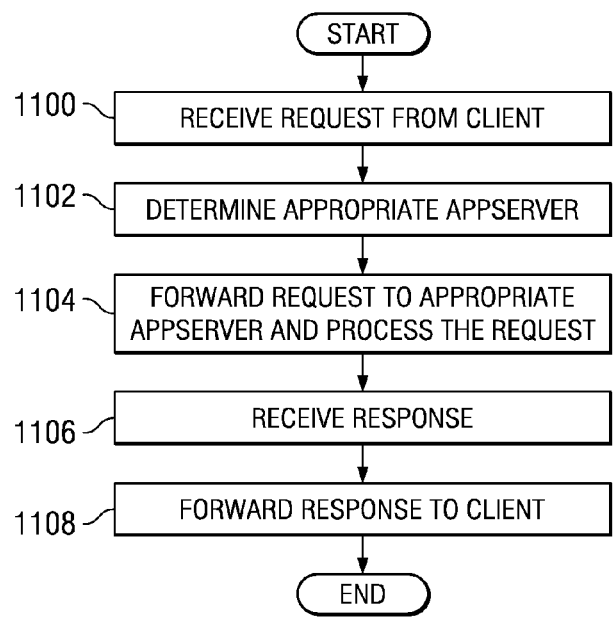

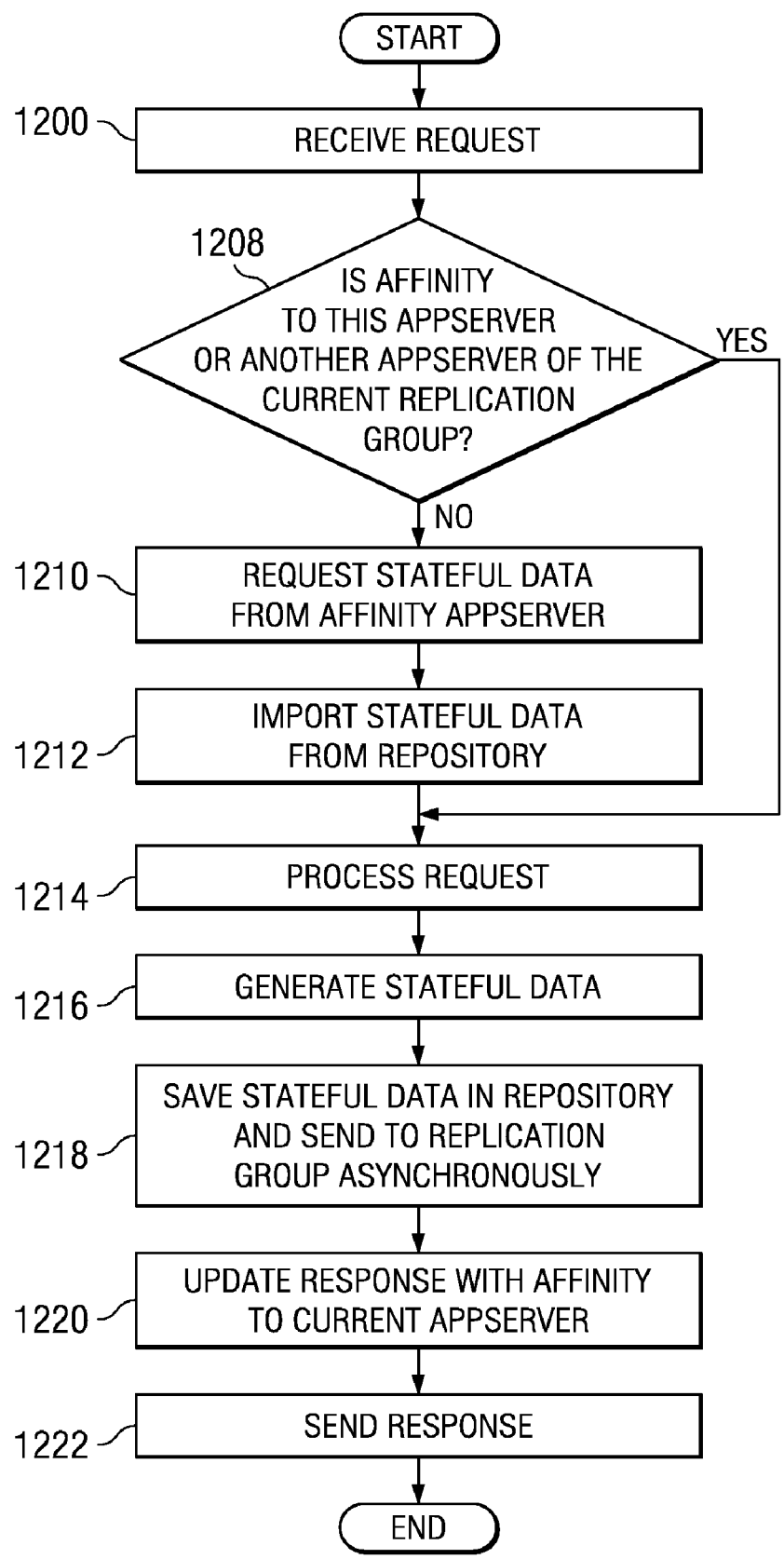

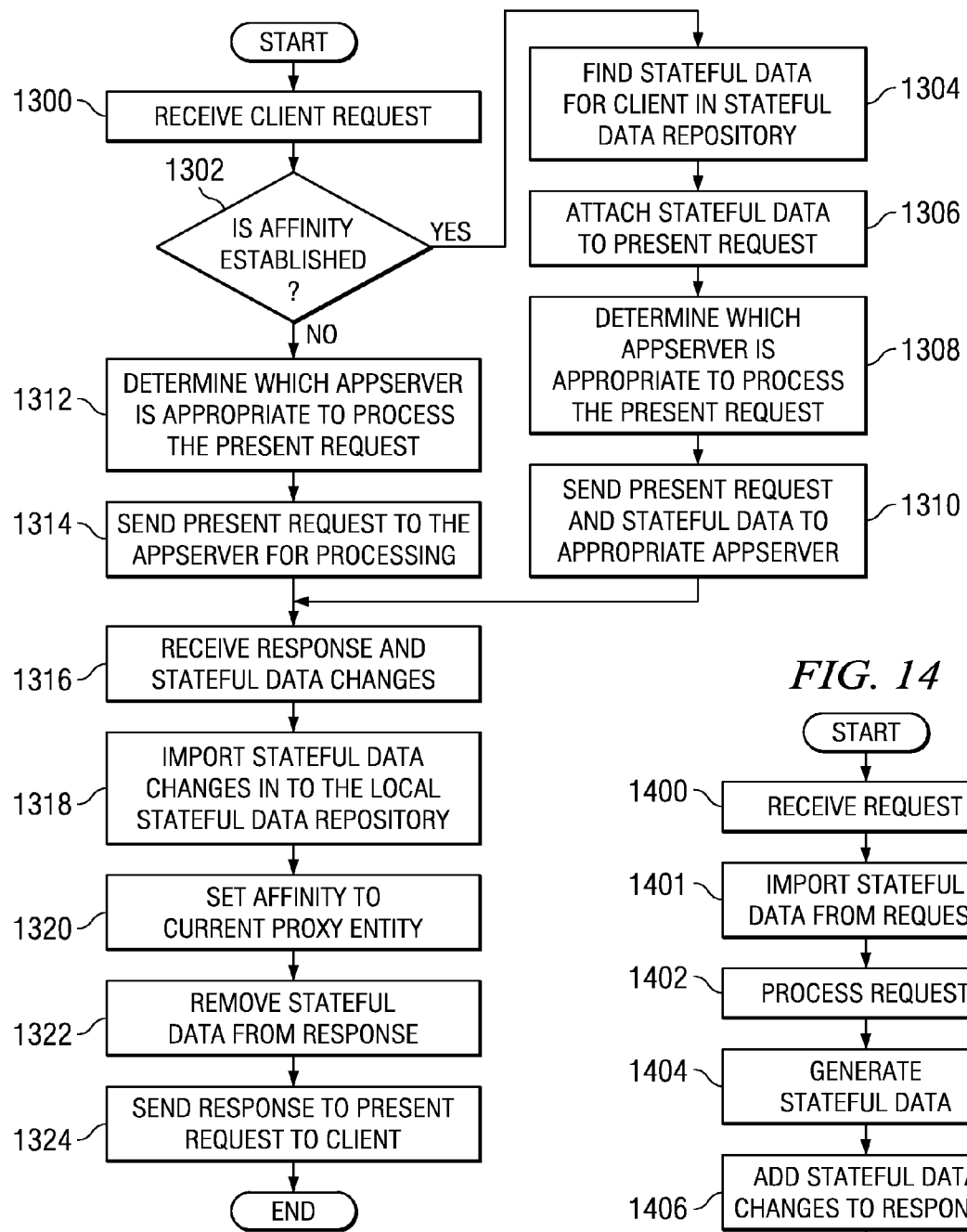

MANAGING STATEFUL DATA IN A PARTITIONED APPLICATION SERVER ENVIRONMENT

BACKGROUND OF THE INVENTION

1. Field of the Invention

The present invention relates generally to an improved data processing system and in particular to a method and apparatus for maintaining stateful data in a network environment. Still more particularly, the present invention relates to a computer implemented method, apparatus, and computer usable program code for managing data in a partitioned application server environment.

2. Description of the Related Art

Modern business computer network systems handle vast quantities of information and vast numbers of complex transactions on an hourly basis. To handle the workload imposed by the amount of information and the number of complex transactions, computer network systems are composed of multiple physical servers executing one or more pieces of software designed to process the transactions. These pieces of software are known as applications.

An instance of an application on a physical server is known as an application server, also known as appserver. One or more application servers can be grouped together into a cluster in order to increase the processing power of an application.

Another problem associated with managing large quantities of complex transactions is downtime caused by failure of a single appserver failure. In order to minimize downtime, systems are configured to achieve nearly instantaneous failover. Achieving instantaneous failover involves making all critical data easily available even after failure of an application server. Making critical data easily available involves saving the critical data in a manner such that a backup application server can access the critical data in case of a failure of the primary server.

For example, critical data can be made easily available by saving the critical data in a shared storage medium. An example of a shared storage medium is a database. In this example, each time an application server processes a request and generates data which should be available for future requests, the application server copies the data to the shared medium. Thus, every application server has access to critical data from every other application server. Accordingly, in the event of a failure of one application server, the request is routed to another application server that can retrieve the critical data from the shared medium and process the request.

Another approach to making critical data easily available is to use replication groups. A replication group is a number of application servers associated with each other for storage purposes. For example, a cluster of application servers can be divided into one or more replication groups. Within a replication group, critical data is distributed to all other members of the replication group and kept up to date. In essence, any time a member of the replication group updates its critical data, that member communicates those updates to one, a number, or all other application servers in the replication group. Thus, one or more other members of the replication group will be up to date and can act in the absence of the first member of the replication group. In the event of a failure of one of the application servers, the other members of the replication group can handle requests for the failed server.

Different types of critical data exist. One type of critical data is stateful data. Stateful data is any data pertaining to a client that persists for a series of requests known as a session. A session is a series of requests that begins with the creation of a first stateful data and ends with a specific request from the client to end the session. A session may also be ended via a limit condition, such as a time limit that prevents a session from lasting more than a predetermined time. The contents of stateful data vary because the application directly determines the stateful data.

Once a session is created, a client is said to have affinity to the sever in which the stateful data was created. Affinity is when a client is assigned to a particular application server, possibly along with a list of backup servers from the same replication group. Affinity between a client and an application server is established because the particular application server processed a previous request that generated stateful data in the current session. Thus, when affinity is established, all future requests are routed to that same application server that first created the stateful data, unless that same application server fails and one of the backups takes over.

As described above, a session begins when a client makes a first request that generates stateful data and ends when a client terminates the session through a specific request, such as a logout request, to the application. The session may also be terminated when the session times out due to the client's non-responsiveness. A client can make a series of stateless requests that do not include generation of or reference to stateful data before, during or after the session. These stateless requests made before and after the session are not part of the session, but stateless requests during the session are included in the session for proper management of the stateful data.

When affinity exists between a client and an application server, requests from the client and responses from the application server contain affinity information. Affinity information includes the identity of the primary affinity application server, the backup application server available in case of failure of the affinity server, and a key that uniquely identifies the client's stateful data in the affinity application server's stateful data repository and in all backup application servers' stateful data repositories. A stateful data repository can be any physical object or data structure suitable for storing data, such as a hard disk drive, random access memory, and other forms of physical memory, or a database, a flat data file, or other forms of data structures suitable for holding data.

To better manage large amounts of complex data, applications can be split into one or more logical partitions known as application partitions. An application partition is designated to handle a subset of all requests for an application. A set of rules in the application maps each request into a particular application partition and each application partition onto an application server. An application partition typically resides only on one application server, but can also reside on a group of application servers. By partitioning the application in this manner, many optimizations can be made via reducing the dataset that can occur on any one application server at any one time.

An example of the above-described concepts in use can be described for a large clothing retailer that maintains a complex business system. A client orders a pair of pants and a shirt online. The client first make requests to purchase a shirt by adding the shirt to his shopping cart. The client then makes a series of requests to purchase a pair of pants and add the pair of pants to the shopping cart. To more efficiently execute these requests, the business system is designed to route requests associated with the purchase of the pair of pants to one application server partition and the requests associated with the purchase of the shirt to a second application server partition. These two application server partitions can reside on separate physical servers. The first and second application server partitions do not necessarily communicate with each other to coordinate the sale to the single client.

The failure to communicate results from the fact that stateful data related to the client is not exchanged between the first and second application partitions. In the above example, data related to the client and the transaction is stateful data. Specifically, data related to the contents of the shopping cart, and data related to the fact that the shirt and the pair of pants are to be shipped to the same client in the same package, are stateful data.

Current solutions to address this problem of maintaining stateful data in a partitioned environment involve creating a façade layer to the application server environment. The façade layer is the entry point to the application server environment and maintains a master copy of the stateful data. The facade layer is placed logically in front of a set of application server partitions. When the façade layer receives a request, the façade layer makes a remote request to the appropriate application server partition including any stateful data needed by the application server partition to process the request. Thus, the client or customer communicates with the façade layer, which then decides to which application server partition a request should be routed. Eventually, the appropriate application server partition sends a response back to the façade layer. The façade layer reads and processes the response, which can include updates to stateful data, before sending out a final response to the client or customer.

Continuing the above example, the two requests for adding the pair of pants and shirt to the shopping cart are coordinated by the façade layer. The request for the pair of pants is received by the facade layer and then forwarded to the appropriate application server partition to obtain price information and other information regarding the shirt and the purchase of the shirt. The facade layer receives a response from the application server partition, processes the response and then finds that a pair of pants was added to the shopping cart at a certain price. The application server then updates the stateful data so that this fact persists across any subsequent requests. On the subsequent request for a shirt, a similar pattern occurs and ultimately the facade layer updates the stateful data to show both a pair of pants and a shirt in the shopping cart. Finally, the user sends a request to purchase the contents of the shopping cart. The facade layer will route the request to purchase to a particular application server or application server partition designated to handle purchase requests. The purchasing application server or application server partition processes the order, causes the transfer of funds, and causes the shirt and the pair of pants to be shipped to the client in one package.

A problem with the façade layer solution is that the façade layer is extremely complex in an environment that is already complex. Thus, the façade layer solution is difficult and expensive to maintain. Additionally, the facade layer also consumes more server side resources, including processor cycles and network bandwidth, ultimately reducing any benefit gained from implementing application server partitions in the first place.

BRIEF SUMMARY OF THE INVENTION

A computer implemented method for managing a series of stateful requests for processing in a partitioned application environment. A request is received from a client at the partitioned application environment to form a received request. An application server in a plurality of application servers is identified in the partitioned application server environment based on the received request to form an identified application server. The received request is sent to the identified application server. Stateful data is migrated for use by application servers in the plurality of application servers.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart illustrating management of stateful data on a proxy entity side of a system, in accordance with an illustrative embodiment;

FIG. 11 is a flowchart illustrating management of stateful data on a proxy entity side of a system, in accordance with an illustrative embodiment;

FIG. 12 is a flowchart illustrating management of stateful data on an application server side of a system, in accordance with an illustrative embodiment;

FIG. 13 is a flowchart illustrating management of stateful data on a proxy server side of a system, in accordance with an illustrative embodiment;

FIG. 14 is a flowchart illustrating management of stateful data on an application server side of a system, in accordance with an illustrative embodiment;

DETAILED DESCRIPTION OF THE INVENTION

Figure 1:
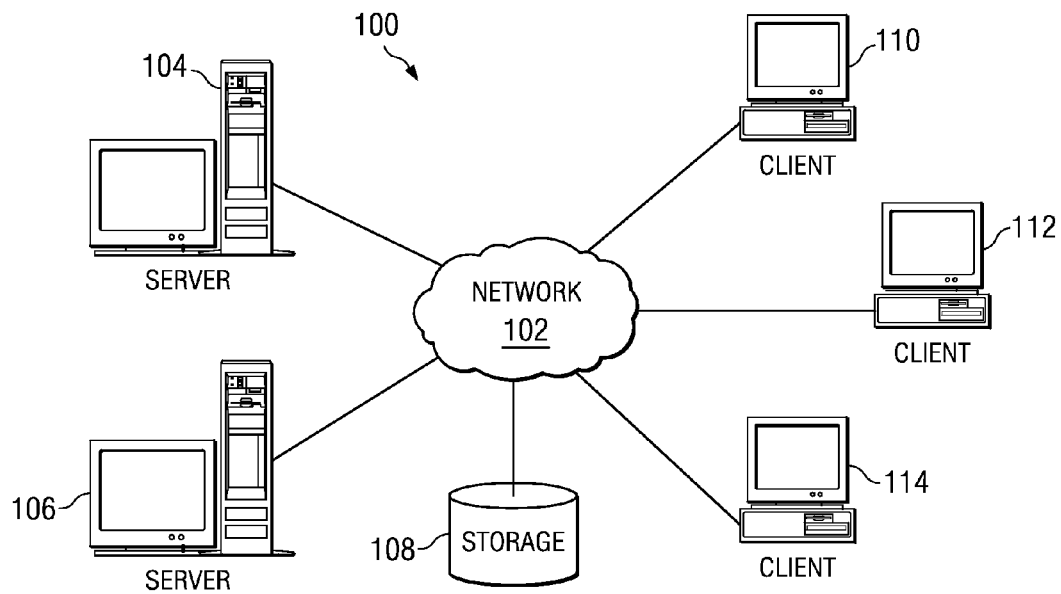
FIG. 1 depicts a network of data processing systems in which an illustrative embodiment may be implemented.
Figure 2:
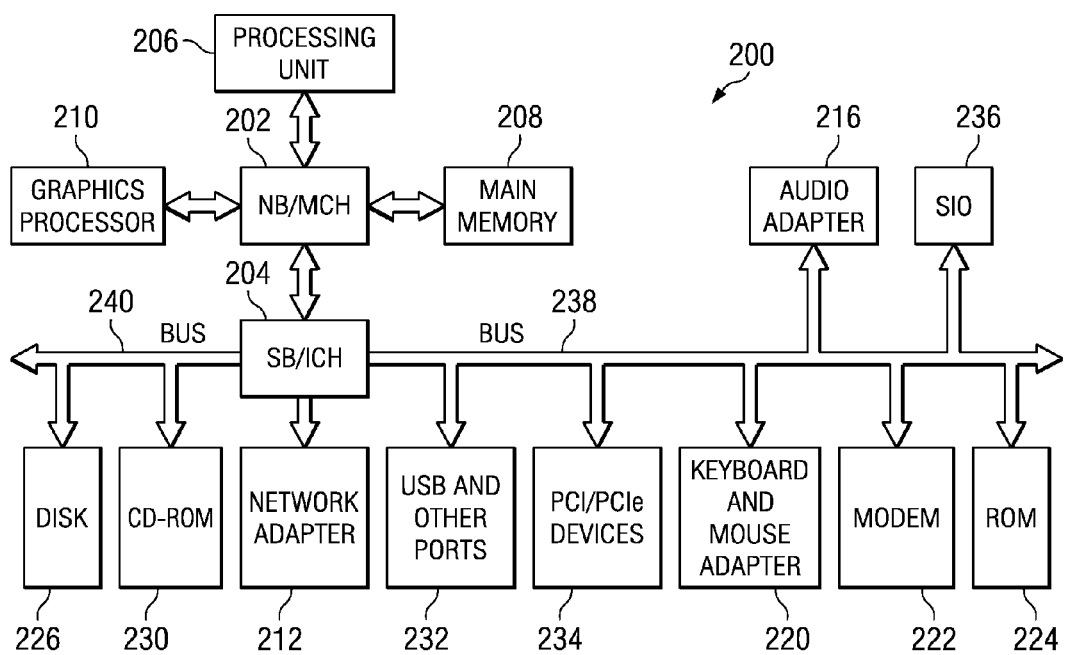
FIG. 2 is a block diagram of a data processing system in which an illustrative embodiment may be implemented.

With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which illustrative embodiments may be implemented. Many modifications to the depicted environments may be made without departing from the spirit and scope of the described embodiments.

With reference now to the figures, FIG. 1 depicts a pictorial representation of a network of data processing systems in which illustrative embodiments may be implemented. Network data processing system 100 is a network of computers or data processing systems in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as one that may be found in client layer 100 or server layer 120 of FIG. 1, in which computer usable code or instructions implementing illustrative embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes illustrative embodiments are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of illustrative embodiments may be applied to a multiprocessor data processing system.

A bus system may be comprised of one or more buses, such as bus 238, or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide for a computer implemented method for managing a series of stateful requests for processing in a partitioned application environment. A request is received from a client at the partitioned application environment to form a received request. An application server in a plurality of application servers is identified in the partitioned application server environment based on the received request to form an identified application server. The received request is sent to the identified application server. Stateful data is migrated for use by application servers in the plurality of application servers.

Thus, the illustrative embodiments provide for a method of processing transactions and handling data in a partitioned application server environment. A partitioned applications server environment is computing environment in which one or more partitioned application servers are running. An application server is partitioned if the applications server is logically divided in some way, in terms of processing of types transactions, processing transactions from a particular source, or some other category of processing transactions. As stated above, an instance of an application on a physical server is known as an application server.

Figure 3:
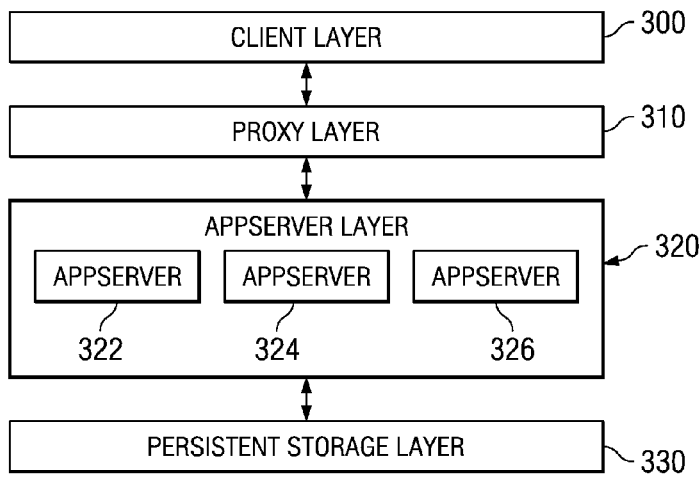
FIG. 3 is a block diagram of a system for managing stateful data in which an illustrative embodiment may be implemented.

FIG. 3 is a block diagram of a system for managing stateful data in which an illustrative embodiment may be implemented. Client layer 300 is a computer or set of computers, such as data processing system 200 shown in FIG. 2 or client data processing systems 110, 112, or 114 in FIG. 1. Client layer 300 can represent a single client or a plurality of clients. Proxy layer 310 is a single physical server or a cluster of physical servers. The physical servers within the cluster of physical servers can be associated with each other or can be an individual separate physical server. Alternately, proxy layer 310 can also be software located on a client computer in client layer 300 (as further depicted in FIG. 4) or in an application server (appserver) layer 320 as depicted in FIG. 5, rather than on a separate physical server computer. Client layer 300 uses proxy layer 310 as an intermediary to connect to a network data processing system.

In the depicted example, application servers 322, 324, and 326 exist in application server layer 320. Application servers 322, 324, and 326 provide services and data, such as applications and stateful data, to the clients in client layer 300. Application servers 322, 324, and 326 are connected either point-to-point or through a bus. Application servers 322, 324, and 326 may also form an application server cluster in which the described embodiments can be implemented. An application server cluster may include more or fewer application servers and is not limited to the number of application servers presented in the illustrative embodiment.

Persistent storage layer 330 connects to application server layer 320. Persistent storage layer 330 is a repository of data used to support application servers 322, 324, and 326 in application server layer 320. The data within persistent storage layer 330 is a central data storage system and is maintained even in case application servers 322, 324, or 326 are out of service or have a power outage. FIG. 3 is intended as an example, and not as an architectural limitation of the described embodiments.

Figure 4:
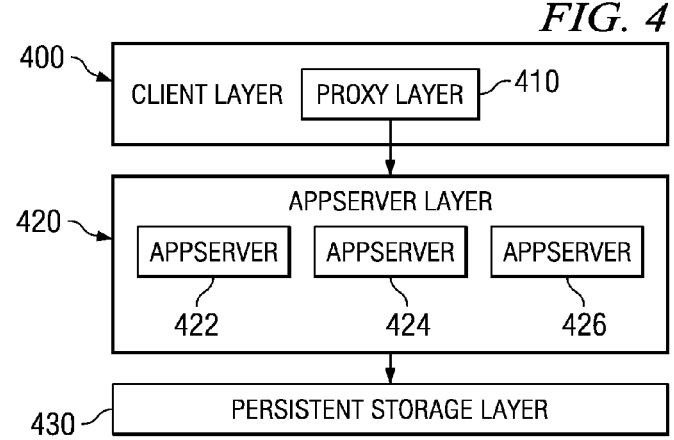
FIG. 4 is a block diagram of a system for managing stateful data in which an illustrative embodiment may be implemented.
Figure 5:
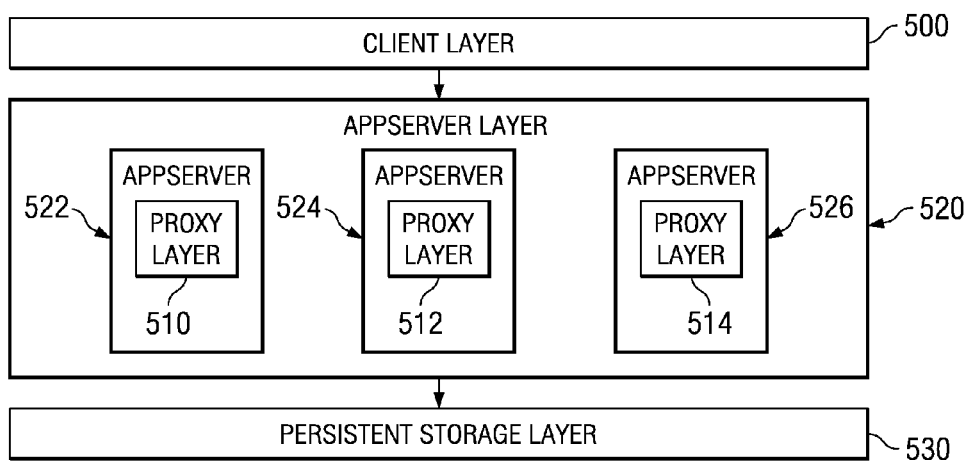
FIG. 5 is a block diagram of a system for managing stateful data, in which an illustrative embodiment may be implemented.

FIG. 4 and FIG. 5 illustrate that a proxy layer can be in a client layer or an application server layer in addition to the stand-alone proxy layer shown in FIG. 3. Thus, FIG. 4 is a block diagram of a system for managing stateful data in which an illustrative embodiment may be implemented. The system shown in FIG. 4 is similar to the system shown in FIG. 3. However, in the system shown in FIG. 4, proxy layer 410 exists within client layer 400. Remaining components of FIG. 4 are similar to those shown in FIG. 3 such that application server layer 420 corresponds to application server layer 320; application servers 422, 424, and 426 correspond to application servers 322, 324, and 326; and persistent storage layer 430 corresponds to persistent storage layer 330.

FIG. 5 is a block diagram of a system for managing stateful data, in which an illustrative embodiment may be implemented. The system shown in FIG. 5 is similar to the system shown in FIG. 3. However, in the system shown in FIG. 5, three proxy layers exist. A first proxy layer 510 is in application server 522. A second proxy layer 512 is in application server 524. A third proxy layer 514 is in application server 526. Remaining components of FIG. 5 are similar to those shown in FIG. 3 such that client layer 500 corresponds to client layer 300, application server layer 520 corresponds to application server layer 320; application servers 522, 524, and 526 correspond to application servers 322, 324, and 326; and persistent storage layer 530 corresponds to persistent storage layer 330.

The illustrative embodiments described herein relate to migrating stateful data from one application server to another application server as efficiently as possible. As used herein, the term "migrate" refers to moving or copying data from one physical server and/or application server to another physical server and/or application server. In an illustrative embodiment, a client generates stateful data in a first application server partition in an application server partitioned environment. When the client is directed to a second application server partition and the second application server partition accesses the stateful data, the stateful data is migrated from the first application server to the second application server.

Several methods exist to migrate stateful data in this manner. Which method is selected depends on a particular implementation. For example, three basic approaches to migrating stateful data are as follows. First, requests can be routed to the correct application server partition as determined by the application's rules pertaining to mapping requests to application partitions. In this case, the correct application server partition requests the stateful data from a previous server associated with the request. Second, requests can be routed to the affinity application server that contains the stateful data. In this case, the affinity application server determines if it is the correct server. If not, then the affinity application server forwards the request to another application server along with any stateful data that exists on the current server. Third, a shared medium can be used to store stateful data. These three basic approaches can be used in combination with each other.

In the first example, routing the request is treated as stateful data and affinity information is ignored in the proxy layer. The proxy layer examines the application partition rules to determine which application partition should handle the request. When the request reaches the application partition, the request is examined for whether the request has affinity to an application server that is not the current application server. If the request has affinity to a different application server and the current request accesses any stateful data, then a request is made to that affinity server to retrieve the stateful data and import the stateful data into the current application server's stateful data repository. The response is then marked to indicate that affinity is currently associated with the current server, rather than with the original affinity server.

All of the processing used to migrate stateful data, and to mark the response to indicate new affinity, is only performed when the stateful data is first accessed. Thus, unnecessary stateful data migration is minimized in the event of stateless requests that occur in the middle of a session. Where stateless requests are received in the middle of a session, the response is left marked with affinity pointing at the original affinity server.

In the above scenario, certain optimizations can be made when replication groups are in use at the application server partition tier. Before a remote request is made to the affinity server to obtain the stateful data, the request can be further examined to determine if the current application server is in the list of backups to the affinity application server. If so, the current application server was already sent a copy of the stateful data through the replication group. Accordingly, the current application server can simply access the local copy.

In the second case, where requests are routed to the affinity application server that contains the stateful data, routing the request is also simple. In this case, the request is always routed to the affinity application server. If affinity does not exist, such as in the case of the first request, the request is routed to the application server partition as determined by the application's rules. When the request reaches the application server partition, the request is examined to determine if the current application server is the proper application server to handle the request. If the current application server is both the affinity server and the appropriate application server partition to handle the request, the current application server processes the request. The current application server accesses stateful data as needed from the local repository and sends a response indicating affinity to the current application server.

If the current application server is not the appropriate application server partition, the current application server removes its copy of the stateful data from its repository and adds the copy of the stateful data to the request. The request is then forwarded to the appropriate application server partition. Eventually, the appropriate application server partition responds with a response which indicates new affinity is associated with that application server. The current application server then reads this response and sends the unmodified response to the client.

In the above scenario, certain optimizations can be made when replication groups are in use. At the routing decision on the proxy layer, if the appropriate application server partition is in the list of backup application servers for the affinity application server, the request can be routed directly to the appropriate application server. Direct routing can be performed because the appropriate application server already has a local copy of the stateful data through the replication group. This technique avoids the processing overhead of the affinity application server using the proxy to send the request to the appropriate application server.

The third method, using a shared medium to store stateful data, can be implemented using a variety of techniques. In one example, each application server has access to a shared medium that every application server uses as a stateful data repository. However, such a shared medium can be expensive and slow. Nevertheless, if the technique is already in use, the best approach can be to use this mechanism to migrate stateful data as well.

A shared medium can also be located in front of the application server partitions in a proxy layer. In this case, the proxy layer maintains a central repository for all stateful data. To make the stateful data easily available, several proxy servers can be utilized by using an in-memory replication strategy. In this case, routing a request is simple, because the proxy always routes requests to the application server partition determined by the application's rules.

However, before routing a request to the appropriate application server partition, the request is examined to determine if affinity and stateful data are associated with the request. If affinity and stateful data exist, then the proxy first obtains the corresponding stateful data from its local repository and adds the stateful data to the request. When the application server partition receives the request, the stateful data is imported and the request is processed. Stateful data is accessed as needed. When finished, if the stateful data was modified, the application server partition includes the modifications in the response to the proxy. The proxy in turn imports these modifications into its repository, removes the changes from the response, marks the response for affinity to the current proxy, and sends the response to the client.

Figure 6:
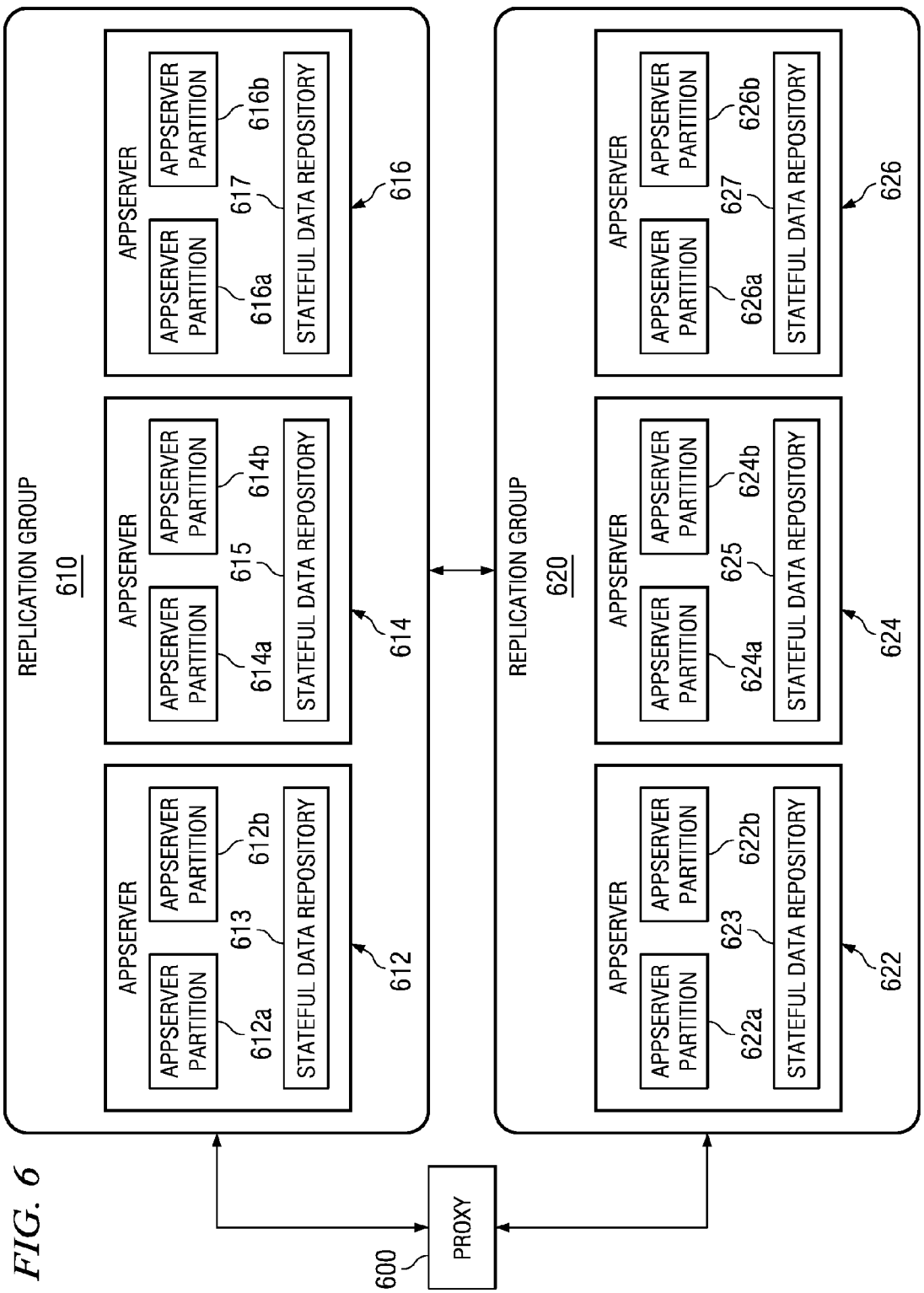
FIG. 6 is a block diagram of a proxy network environment in accordance with an illustrative embodiment where replication groups are in use, in accordance with an illustrative embodiment.

FIG. 6 is a block diagram of a proxy network environment in accordance with an illustrative embodiment where replication groups are in use, in accordance with an illustrative embodiment. Proxy 600 is connected to application servers 612, 614, 616, 622, 624, and 626 through a network or other communication medium such as a bus. Each of application servers 612, 614, 616, 622, 624, and 626 can be partitioned into one or more application server partitions. For example, application server 612 can be partitioned into application server partitions 612A and 612B. Likewise, application servers 614, 616, 622, 624, and 626 can be partitioned into application servers 614A, 614B, 616A, 616B, 622A, 622B, 624A, 624B, 626A, and 626B, respectively.

In practice, proxy 600 receives a request and uses information stored in the client's request to determine the appropriate application server partition to process the client's request based on the rules defined in the application. Proxy 600 also determines if affinity exists from information stored in the client's request.

If affinity does not exist, as in the case of a first request, then proxy 600 routes the request to the appropriate application server. Stateful data is not associated with the client if affinity does not exist, so no stateful data exists to be migrated. If affinity does exist, proxy 600 uses one of the methods described above to migrate the request and the stateful data to the appropriate application server.

In use, proxy 600 receives a first request from a client and determines the appropriate application server to process the request. Because no affinity has been established in a first request, proxy 600 sends the request to the appropriate application server based on rules for defining application server partitions. For example, proxy 600 determines that the first request is a men's sweater request and application server 612 is the appropriate application server to process the first request. In this case, application server 612 is the appropriate application server because it has been designated to host the application partition that handles men's sweaters. Application server 612 then receives the first request from proxy 600 and processes the first request.

While processing the request, application server 612 also generates stateful data for the first request. For example if the first request is to add a men's sweater to a virtual shopping cart, the virtual shopping cart contents is the stateful data. Application server 612 saves the stateful data in stateful data repository 613. Application server 612 then adds affinity information to the header of the response. The affinity information reflects an affinity between the client and application server 612 with members of its replication group. The other members of the replication group in this illustrative example are application servers 614 and 616. Application servers 614 and 616 serve as backup application servers in case application server 612 cannot be reached.

Application server 612 then sends the response to the first request to proxy 600. Proxy 600 sends the response back to the client. At the same time, application server 612 sends the response to proxy 600. Application server 612 sends update requests to application servers 614 and 616 to update their stateful data with the recent changes made in application server 612. Stateful data repositories 615 and 617 then save the copy of the stateful data in their respective stateful data repositories.

If the appropriate application server is either the affinity server or one of its backup application servers, the proxy routes the request to the appropriate application server. The appropriate application server already has a copy of the stateful data from the activities of the replication group. Hence, the appropriate application server can process the request using the stateful data as desired or needed.

In practice, this subsequent request is handled in much the same way as a first request. Proxy 600 receives a subsequent request from a client and determines the appropriate application server to process the request. Continuing in the above example, proxy 600 determines that the subsequent request is a women's sweater request. In this case, application server 614 is the appropriate application server to process the request because application server 614 hosts the application partition that handles women's sweaters. Proxy 600 also determines the subsequent request that indicates that the client has affinity to application server 612. Proxy 600 makes this determination based on the first request associated with the men's sweater. Proxy 600 also sees that application server 614 and application server 616 are listed as affinity backups to application server 612. Because application server 614 is in the same replication group as affinity application server 612, application server 614 has a copy of the stateful data generated on application server 612. Hence, proxy 600 routes the request directly to the appropriate application server 614.

While processing the request, application server 614 also generates stateful data for the subsequent request. For example if the subsequent request is to add a women's sweater to a virtual shopping cart, the virtual shopping cart contents is the stateful data. Application server 614 saves the stateful data in stateful data repository 615. Application server 614 then adds affinity information to the header of the response. The affinity information reflects an affinity between the client and application server 614, along with members of the corresponding replication group as backups. In this example, the corresponding replication group includes application servers 612 and 616. Application servers 612 and 616 serve as backups in case application server 614 fails or otherwise cannot be reached.

Application server 614 then sends the response to the first request to proxy 600. Proxy 600 then sends the response back to the client. At the same time, application server 614 sends the response to proxy 600. Similarly, application server 614 sends update requests to application servers 612 and 616 to update their stateful data with the recent changes made in application server 614 while processing the subsequent request. Stateful data repositories 613 and 617 then save the copy of the stateful data in their respective stateful data repositories.

On a subsequent request, if the appropriate application server is outside of the affinity application server and its replication group, then proxy 600 can act according to one of two different methods. First, proxy 600 can send the request to the appropriate application partition. In this case, the appropriate application partition can query the affinity application server for the latest stateful data. Second, proxy 600 can send the request to the affinity application server. In this case, the affinity application server attaches the stateful data and forwards the request to the appropriate application server.

These methods can be exemplified by continuing the above example with a men's sweater and a women's sweater. In this case, the proxy sends the requests to the appropriate application servers. The appropriate application servers directly query the affinity application servers for the current stateful data. Proxy 600 then receives a subsequent request. Proxy 600 determines that affinity is to application server 614 from the previous request dealing with the women's sweater, with affinity backups in application server 612 and application server 616. Proxy 600 also determines the request is for a pair of men's pants. Using the application partition rules, proxy 600 maps the request into appropriate application server 622. Because appropriate application server 622 is outside of the affinity application server its replication group (application servers 612, 614, and 616), proxy 600 routes the request for the men's pants to the appropriate application server 622.

While processing the request, application server 622 determines that the affinity information in the request indicates that stateful data exists on appserver 614 from the previous request dealing with the women's sweater. Application server 622 saves this information, but does not retrieve the stateful data from application server 614 yet. The current request may not generate any stateful data. For example, some requests are stateless requests. For this reason, fetching the stateful data from application server 614 is delayed until application server 622 requests information from the stateful data repository. If no such subsequent request arrives for the current request, then the response is marked with affinity information matching the current request. Affinity is then established for application server 614, with backup application servers 612 and 616 in the replication group.

If application server 622 makes a request to the stateful data repository to lookup data or generate new stateful data, then application server 622 imports the stateful data from the affinity server 614. To perform this function, application server 622 generates a request to application server 614 requesting the current stateful data for the current client.

Application server 614 receives this request and then uses the key in the request to lookup the stateful data in the stateful data repository 615. Application server 614 then sends this stateful data back to requesting application server 622. Application server 614 then deletes all stateful data for the client from its local repository 615. Subsequently, application server 614 sends update requests to replication group 610. As a result, the remaining application server in replication group 610 also removes the stateful data for the current client from their local repositories. Application servers 612 and 616 eventually receive the update request and delete the stateful data for the current client from their local repositories 613 and 617.

Application server 622 then receives the response containing the stateful data from application server 614. Application server 622 imports this stateful data into its local repository 623. Application server 622 then continues to process the request now that it has the stateful data. Application server 622 also generates stateful data for the subsequent request.

For example if the subsequent request is a request to add men's pants to shopping cart, the shopping cart contents is the stateful data. Application server 622 saves the stateful data in stateful data repository 623. Application server 622 then adds affinity information to the header of the response reflecting an affinity between the client and application server 622. Application servers 624 and 626 in replication group 620 act as backups in case application server 622 fails or otherwise cannot be reached. Application server 622 then sends the response to the subsequent request to proxy 600. Proxy 600 then sends the response back to the client. At the same time, application server 622 sends the response to proxy 600. Similarly, application server 622 sends update requests to application servers 624 and 626 to update their stateful data with the recent changes made in application server 622 while processing the subsequent request. Stateful data repositories 625 and 627 then save the copy of the stateful data in their respective stateful data repositories.

The above method can be described as a method of routing a request to the appropriate application server and having the appropriate application server request stateful data from the affinity application server. This method is best used when the application has many stateless requests intermingled with requests that deal with stateful data.

Alternatively, continuing the above example with a men's sweater and a women's sweater, the request is sent to the affinity server and the affinity server attaches the current stateful data to the request. The request is forwarded to the appropriate application server while proxy 600 receives a subsequent request. Proxy 600 determines that affinity is to application server 614 from the previous request dealing with the women's sweater, with affinity backups in application server 612 and application server 616. Proxy 600 also determines the request is for a pair of men's pants. Accordingly, proxy 600 uses the application partition rules to map the request into appropriate application server 622. Because appropriate application server 622 is outside of the affinity application server and replication group 610, proxy 600 routes the request to affinity application server 614.

While processing the request, application server 614 determines the appropriate application server is 622. Application server 614 also determines that affinity information in the request indicates stateful data exists on application server 614 from the previous request dealing with the women's sweater.

Application server 614 looks up the stateful data in the local repository 615 and adds this stateful data to the request. Application server 614 then removes the stateful data from the local repository 615 and generates a request to the other members of the replication group 610, such as application servers 612 and 616, to also delete the stateful data. Again, the stateful data corresponds to the current client from the stateful data repositories 613 and 615. Application server 614 then routes the modified request containing the stateful data to the appropriate application server 622.

Application server 622 receives the modified request and realizes the modified request contains stateful data. Accordingly, application server 622 immediately saves the stateful data into its local repository 623. Application server 622 also marks the response indicating affinity is now to application server 622, with backup application servers 624 and 626.

Application server 622 then continues to process the request now that application server 622 has the stateful data. Application server 622 also generates stateful data for the subsequent request. For example, if the subsequent request is an add men's pants to a virtual shopping cart, the virtual shopping cart contents is the stateful data. Application server 622 saves the stateful data in stateful data repository 623. Application server 622 then adds affinity information to the response reflecting an affinity between the client and application server 622. The other members of the replication group, application servers 624 and 626 in the depicted example, act as backups in case application server 622 fails or otherwise cannot be reached.

Application server 622 then sends the response to the subsequent request to old affinity application server 614. The old affinity application server 614 then sends the unmodified response to the proxy 600. Proxy 600 then sends the unmodified response back to the client. At the same time, application server 622 sends the response to the old affinity server 614. Additionally, application server 622 sends update requests to application server 624 and 626 in order to update their stateful data with the recent changes made in application server 622 while processing the subsequent request. Stateful data repositories 625 and 627 then save the copy of the stateful data in their respective stateful data repositories.

The above method can be described as routing a request to the affinity server and having the affinity server route the request with the stateful data from the affinity server to the appropriate server. This method is best used when the application has mostly stateful requests. Additionally, more or less replication groups and more or less application servers within a replication group may also exist in other embodiments.

Figure 7:
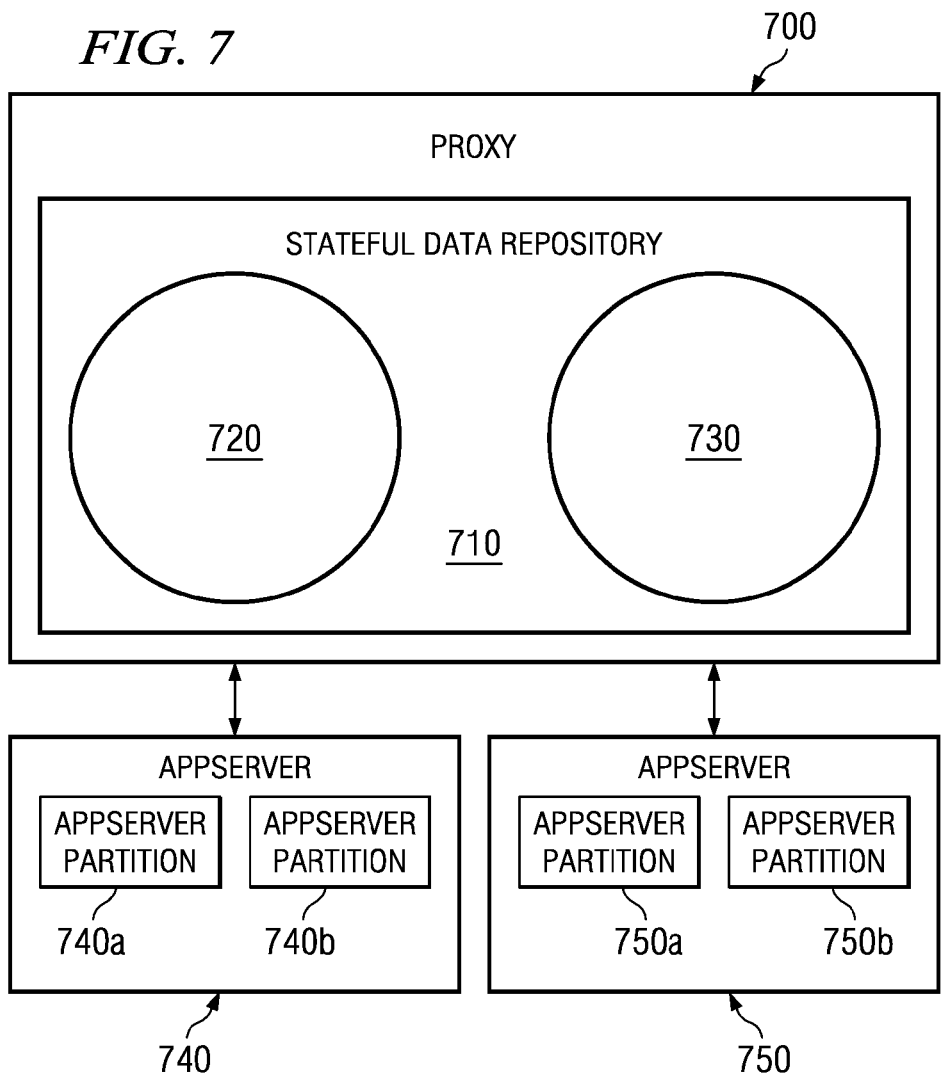
FIG. 7 is a block diagram of a system utilizing a proxy to manage stateful data in a central repository, in accordance with an illustrative embodiment.

FIG. 7 is a block diagram of a system utilizing a proxy to manage stateful data in a central repository, in accordance with an illustrative embodiment. Proxy 700 provides a connection to a network, such as the network described in FIG. 1 or the networking layer shown in FIG. 3. Proxy 700 can be any device that allows for a network connection, such as an application server, gateway, a routing device, or any combination thereof. In this embodiment, the proxy is a separate entity in front of the application partitions. Like the application servers shown in FIG. 6, each application server can have one or more application server partitions. For example, application server 740 can have application server partition 740A and application server partition 740B. Similarly, application server 750 can have application server partition 750A and application server partition 750B.

Proxy 700 receives requests via the network from clients, such as the clients in client layer 300 in FIG. 3. Proxy 700 includes stateful data repository 710, which is software or hardware that maintains a table of stateful data for each request made by a client during a single session.

Application servers 740 and 750 connect to proxy 700 and process all requests submitted by a client. Application servers 740 and 750 are application servers in a partitioned application environment. Application servers 740 and 750 and the application partitions defined on them are designated to handle separate requests. In one embodiment, application server 740 is designed to process all requests of a first type, such as sweater requests, and application server 750 is designated to process requests of a second type, such as all pants requests. In other embodiments, additional or fewer application servers can be present.

After proxy 700 receives a request, proxy 700 reads the request and determines which application server partition is the appropriate application server partition to process the request. Proxy 700 also reads the incoming request to determine if the client has an affinity and thus stateful data. Proxy 700 then looks up the stateful data in the stateful data repository, adds the stateful data to the request, and then sends the modified request to appropriate application server 740 or 750 depending on the rules defining the application server partitions. The appropriate application server then receives the request, imports any stateful data from it, and then processes the request. During processing, application server 740 may generate stateful data related to the request. Application server 740 then sends a response to the request with any generated stateful data back to proxy 700. Proxy 700 then imports the stateful data if included from application server 740 and saves the stateful data in stateful data repository 710. The stateful data is maintained in stateful data repository 710 until the client terminates the session, or until a condition such as a timeout is met.

In this embodiment, affinity will be set to proxy 700. In FIG. 7 only a single proxy is pictured. However, many proxies can exist for failover purposes, much like many application servers exist in replication groups as shown in FIG. 6. In such a setup, the plurality of proxies would serve to make the stateful data repository highly available to guard against a failure in any one of the proxies. Also, if the number of proxies is very large, there may be more than one replication group. In this case, the affinity of client to proxy and its replication group will never be broken. For this reason, the stateful data will be readily available in the proxy and, accordingly, does not need to be migrated. This embodiment is best utilized when the total size of the stateful data is small relative to the speed at which it can be transferred back and forth between the proxy and application server partition.

Figure 8:
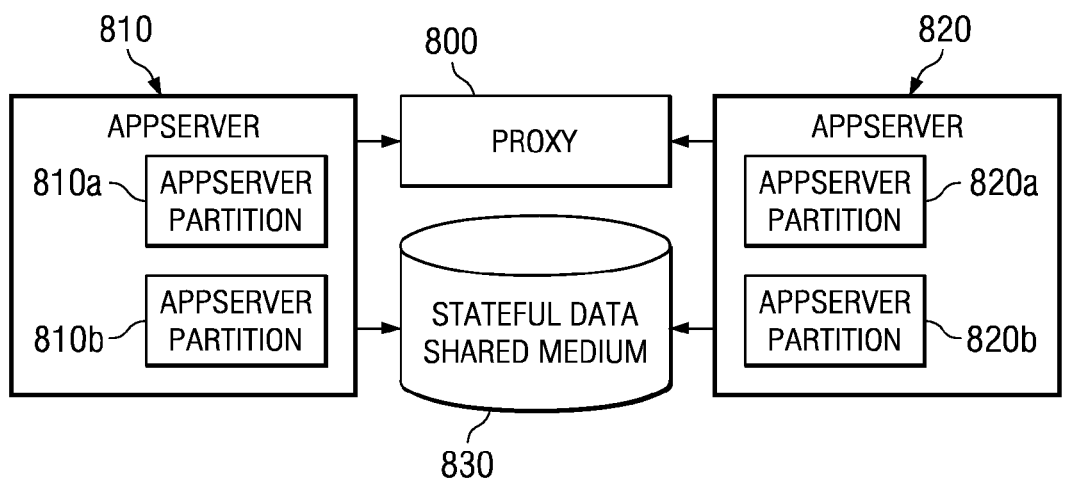
FIG. 8 is a block diagram of a system where a shared medium is used to manage stateful data, in accordance with an illustrative embodiment.

FIG. 8 is a block diagram of a system where a shared medium is used to manage stateful data, in accordance with an illustrative embodiment. Proxy 800 connects to a network, such as the network data processing system described in FIG. 1 or the network layer system shown in FIG. 3. Proxy 800 directs requests from the client to application servers 810 and 820 and vice-versa. Proxy 800 can also be a physical server, gateway, routing device, or any combination thereof, as described with respect to proxy 300 in FIG. 3. Application servers 810 and 820 are application servers in a partitioned application environment. Thus, application servers 810 and 820 can have one or more application server partitions. For example, application server 810 can have application server partitions 810A and 810B. Similarly, application server 820 can have application server partitions 820A and 820B.

Application servers 810 and 820 also connect to shared medium 830. Shared medium 830 is any computer usable, computer readable, or computer recordable medium, such as a physical server, a hard drive, a stateful data repository, a network file system, database, or a table. In the embodiment, shared medium 830 is a table, like stateful data repositories 613, 615, 617, 623, 625, and 627 in FIG. 6 or stateful data repository 710 in FIG. 7. Shared medium 830 stores all stateful data generated while processing a request from the client in a single session.

Shared medium 830 is often employed in an effort to make stateful data highly available. This method is an alternative method to the replication group method described in FIG. 6. In this method, shared medium 830 can be used to easily move stateful data from one application server to the next.

Application servers 810 and 820 process requests and generate stateful data while processing the requests. Application servers 810 and 820 determine from the request if any stateful data exists in the shared medium by examining the affinity information in the request. If the affinity information exists, it indicates where in the shared medium to find the stateful data. Application servers 810 and 820 then pull the stateful data from the shared medium, process the present request, generate stateful data from processing the present request, and send all the stateful data updates back to shared medium 830. The response is then marked with affinity to the current application server, along with any number of other application servers that have access to the shared medium as backups. The response to the request is sent from application servers 810 or 820 back to proxy 800, which directs the response to the request back to the client. Application servers 810 and 820 check shared medium 830 for each request subsequent to the first request. The process continues until the client terminates the session or until some other timeout condition arises.

Although the above examples describe processing stateful data in two application servers, any number of application servers in a distributed system can be used. Additionally, processing of stateful data can be implemented with each application server being partitioned, so that multiple request types can be handled by a single application server.

FIG. 9 is a flowchart illustrating management of stateful data on a proxy entity side of a system, in accordance with an illustrative embodiment. In the illustrative example of FIG. 9, the proxy forwards the request to the affinity server. In turn, the affinity server forwards the request, including any stateful data, to the appropriate server. The process shown in FIG. 9 can be implemented in a network, such as network 100 in FIG. 1 using one or more data processing systems, such as data processing system 200 in FIG. 2. The process shown in FIG. 9 can be implemented with respect to a system for managing stateful data, such as the system shown in FIG. 3.

The process begins as a proxy layer receives a request from a client (step 900). The proxy layer makes a determination whether affinity has been established (step 902). Affinity exists when a client is assigned to a particular application server or group of application servers. Affinity exists because the particular application server or group of application servers processed a previous request that generated stateful data from the client in a single session. If affinity has been established, then the proxy layer forwards the request to the affinity application server (step 908).

If affinity has not been established, then the proxy layer determines the appropriate application server to process the request (step 904). The proxy layer then forwards the request to the application server determined in step 904 (step 906).

The appropriate application server, whether the affinity server from step 908 or the determined application server in step 906 then processes the request. After processing the request, the appropriate application server sends a response back to the proxy layer, which receives the response (step 910). The proxy layer then forwards the response to the client (step 912).

Figure 10:
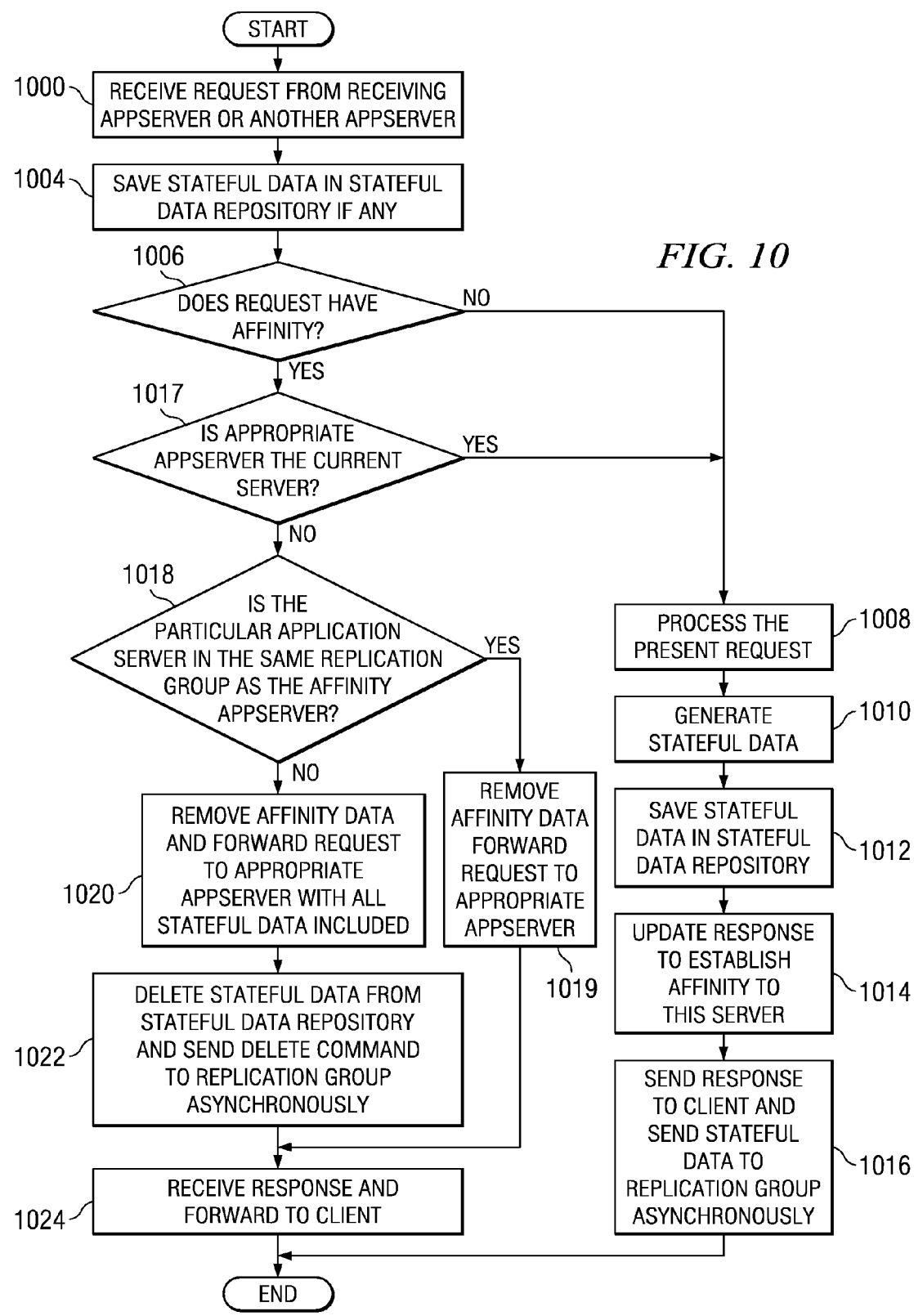
FIG. 10 is a flowchart illustrating management of stateful data on an application server side of a system, in accordance with an illustrative embodiment.

FIG. 10 is a flowchart illustrating management of stateful data on an application server side of a system, in accordance with an illustrative embodiment. In the illustrative example of FIG. 10, the proxy forwards a request to the affinity application server and the affinity application server forwards the request, including any stateful data, to the appropriate application server. The process shown in FIG. 10 can be implemented in a network, such as network 100 in FIG. 1 using one or more data processing systems, such as data processing system 200 in FIG. 2. The process shown in FIG. 10 can be implemented with respect to a system for managing stateful data, such as the system shown in FIG. 3.

The process begins as an application server receives a request from a proxy (step 1000). Similarly, the process can begin when a request is received from another application server that was the initial affinity application server, wherein the initial affinity application server has forwarded the request with stateful data attached (step 1000). If the request contains stateful data, then the current application server saves the stateful data in a stateful data repository (step 1004).

Next, the current application server determines whether the request has affinity (step 1006). If the request does not have affinity, then the current application server processes the request (step 1008). During processing, the current application server generates stateful data related to the request (step 1010). The current application server saves the stateful data in a stateful data repository (step 1012). The current application server then updates the response to the client to establish affinity to the current application server (step 1014). The current application server then sends the response to the proxy or to the original affinity application server and also sends stateful data to a replication group asynchronously (step 1016). The process terminates thereafter. Steps 1010 through 1016 are optional as these steps may not occur for every request if the request is of the stateless variety.

Returning to step 1006, if the request does have affinity, then the current application server determines whether the appropriate application server is the same as the current server (step 1017). If the current server is both the affinity application server and the appropriate application server, the process continues with step 1008 and is processed in the same manner as described above.

If the affinity application server and appropriate application server are different, the current application server determines if the appropriate application server is in the same replication group as the affinity application server (step 1018). If the result of the determination is "yes," the affinity information is removed from the request and the request is forwarded to the appropriate application server (step 1019). Eventually the current application server receives a response from the appropriate application server and forwards that response to the client, which is a proxy (step 1024). The process terminates thereafter.

Returning to step 1018, if the appropriate application server is outside of the replication group of the current application server, the affinity information is removed from the request and the request is forwarded to the appropriate application server, along with any stateful date from the current application server (step 1020). The current application server then deletes stateful data from the stateful data repository and sends a delete command to the replication group asynchronously (step 1022). The current application server then receives the response from the appropriate application server and forwards the response to the client, which is a proxy (step 1024). The process terminates thereafter.

FIG. 11 is a flowchart illustrating management of stateful data on a proxy entity side of a system, in accordance with an illustrative embodiment. In the illustrative embodiment shown in FIG. 11, the proxy routes requests to the appropriate application server partition. In turn, the appropriate application server partition obtains any stateful data from the affinity application server directly. The process shown in FIG. 11 can be implemented in a network, such as network 100 in FIG. 1 using one or more data processing systems, such as data processing system 200 in FIG. 2. The process shown in FIG. 11 can be implemented with respect to a system for managing stateful data, such as the system shown in FIG. 3.

The process begins as a proxy receives a request from a client (step 1100). The proxy determines the appropriate application server to which the request will be routed (step 1102). The proxy then forwards the request to the appropriate application server (step 1104). The appropriate application server receives and processes the request. The proxy, in turn, receives the response from the application server (step 1106). The proxy then forwards the response to the client (step 1108), with the process terminating thereafter.

FIG. 12 is a flowchart illustrating management of stateful data on an application server side of a system, in accordance with an illustrative embodiment. In the illustrative embodiment of FIG. 12, the proxy routes the request to the appropriate application server partition. In turn, the appropriate application server partition directly obtains any stateful data from the affinity application server. The process shown in FIG. 12 can be implemented in a network, such as network 100 in FIG. 1 using one or more data processing systems, such as data processing system 200 in FIG. 2. The process shown in FIG. 12 can be implemented with respect to a system for managing stateful data, such as the system shown in FIG. 3.

The process begins as the current application server receives a request from the proxy (step 1200). The current application server then determines if affinity exists to the current application server or to another application server within the current replication group (step 1208). If affinity does not exist for the receiving application server, then the current application server requests stateful data from the affinity application server (step 1210). The current application server then imports the stateful data from the response it received from the affinity server into its repository (step 1212).

The process continues as the current application server processes the request (step 1214). This step occurs either after importing stateful data in step 1212 or if the current application server determines that affinity exists for the current application server or another application server in the current replication group in step 1208. As a result of processing the request, the receiving application server generates additional stateful data (step 1216). The receiving application server saves the stateful data in the stateful data repository and sends the stateful data to the replication group asynchronously (step 1218). The receiving application server then updates the response to the proxy with affinity information to the current application server for use in future requests (step 1220). The receiving application server then sends the response back to the proxy (step 1222). The process terminates thereafter.

FIG. 13 is a flowchart illustrating management of stateful data on a proxy side of a system, in accordance with an illustrative embodiment. In the illustrative embodiment of FIG. 13, the proxy acts as a central repository for stateful data. The stateful data is passed back and forth between the proxy and the application server. The process shown in FIG. 13 can be implemented in a network, such as network 100 in FIG. 1 using one or more data processing systems, such as data processing system 200 in FIG. 2. The process shown in FIG. 13 can be implemented with respect to a system for managing stateful data, such as the system shown in FIG. 3. In the process shown in FIG. 12, no proxy need be used.

The process begins as the receiving proxy receives a client request (step 1300). The receiving proxy then determines whether affinity has been established for the request (step 1302). If affinity has been established for the request, then the receiving proxy server finds stateful data for the client in the stateful data repository (step 1304). The receiving proxy then attaches stateful data to the present request (step 1306). The receiving proxy determines which application server would be the appropriate application server to process the present request (step 1308). The receiving proxy then sends the present request and the accompanying stateful data to the appropriate application server (step 1310).

The proxy receives the response from the appropriate application server with any stateful data changes (step 1316). The proxy server then imports the stateful data from the response into the local repository (step 1318). The proxy server then sets the affinity to the current proxy entity with other members of the proxy entity replication group as backups (step 1320). The proxy server then removes stateful data from the response to be sent to the client (step 1322). The proxy server finally sends a response to the present request to the client (step 1324), with the process terminating thereafter.

Returning to step 1302, if the receiving proxy determines that affinity has not been established for the request, then the receiving proxy determines which application server is the appropriate application server to process the present request (step 1312). The receiving proxy then sends the present request to the appropriate application server for processing (step 1314). The proxy server eventually receives a response from the appropriate application server with any stateful data changes attached (step 1316). The process then continues with steps 1318 through 1324, as described above.

FIG. 14 is a flowchart illustrating management of stateful data on an application server side of a system, in accordance with an illustrative embodiment. In the illustrative embodiment shown in FIG. 14, the proxy acts as a central repository for stateful data. The stateful data is passed back and forth between the proxy and the application server. The process shown in FIG. 14 can be implemented in a network, such as network 100 in FIG. 1 using one or more data processing systems, such as data processing system 200 in FIG. 2. The process shown in FIG. 14 can be implemented with respect to a system for managing stateful data, such as the system shown in FIG. 3.

The process begins with the receiving application server receiving a request from a proxy (step 1400). The receiving application server then imports any stateful data from the request, if stateful data exists (step 1401). The receiving application server processes the request (step 1402) and generates stateful data related to the request (step 1404). The receiving application server then adds the stateful data changes to the response to be sent to the proxy (step 1406). The receiving application server finally sends the response and the stateful data to a proxy entity, which forwards the response to the client (step 1408). The process terminates thereafter.

Figure 15:
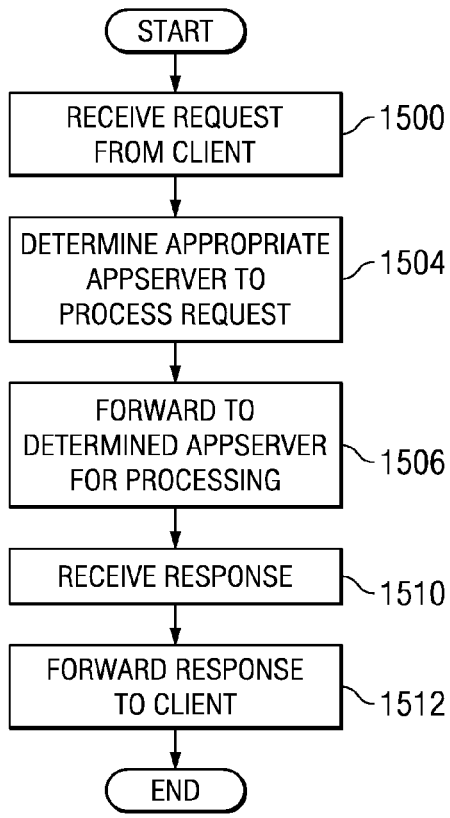
FIG. 15 is a flowchart illustrating management of stateful data on a proxy entity side of a system, in accordance with an illustrative embodiment.

FIG. 15 is a flowchart illustrating management of stateful data on a proxy entity side of a system, in accordance with an illustrative embodiment. In the illustrative embodiment shown in FIG. 15, a shared medium is used to store the stateful data. The process shown in FIG. 15 can be implemented in a network, such as network 100 in FIG. 1 using one or more data processing systems, such as data processing system 200 in FIG. 2. The process shown in FIG. 15 can be implemented with respect to a system for managing stateful data, such as the system shown in FIG. 3.

The process begins when the proxy receives a request from the client (step 1500). The process continues with the proxy determining the appropriate application server partition to process the request (step 1504). The proxy then forwards the request to the appropriate application server for processing (step 1506). The proxy eventually receives a response from the appropriate application server (step 1510) and forwards this response to the client (step 1512). The process terminates thereafter.

Figure 16:
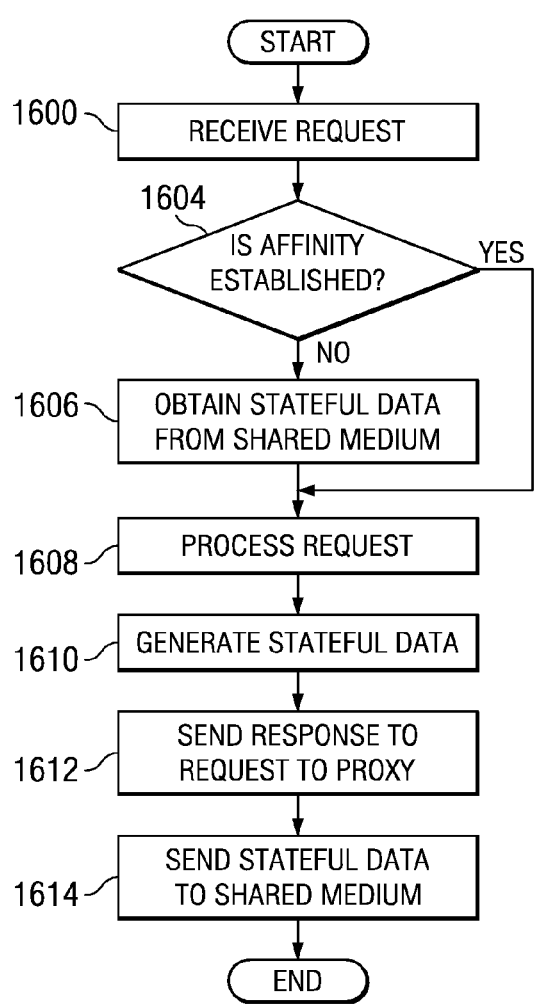
FIG. 16 is a flowchart illustrating management of stateful data when using persistent stateful data on a shared medium, in accordance with an illustrative embodiment.

FIG. 16 is a flowchart illustrating management of stateful data when using persistent stateful data on a shared medium, in accordance with an illustrative embodiment. In the illustrative embodiment shown in FIG. 16, a shared medium is used to store stateful data. The process shown in FIG. 16 can be implemented in a network, such as network 100 in FIG. 1 using one or more data processing systems, such as data processing system 200 in FIG. 2. The process shown in FIG. 16 can be implemented with respect to a system for managing stateful data, such as the system shown in FIG. 3.

The process begins as an application server receives a request (step 1600). The receiving application server determines whether affinity exists for the request (step 1604). If affinity exists, then the receiving application server obtains stateful data from a shared medium (step 1606).

If affinity does not exist in step 1604, or after obtaining stateful data from the shared medium in step 1606, then the receiving application server processes the request (step 1608). If the request will generate stateful data, then the receiving application server generates stateful data associated with the request (step 1610). The receiving application server then sends a response to the proxy (step 1612). Finally, if stateful data is present, the receiving application server sends stateful data to a shared medium such as a stateful data repository (step 1614). The process terminates thereafter.

The illustrative embodiments described herein provide a computer implemented method, apparatus, and computer usable program code for managing a request for processing in a partitioned application server environment. In an exemplary method, a request is received from a client at the partitioned application server environment to form a received request. An application server is identified in a plurality of servers in a partitioned application server environment based on the request. The request is then sent to the identified application server and stateful data is migrated for use by application servers in the plurality of application servers.

In one embodiment, the stateful data is migrated by saving the stateful data in a stateful data repository within the identified application server. The identified application server is clustered with other application servers in a replication group. A replication mechanism in each replication group can replicate the stateful data and send a copy of the replicated stateful data to each of the application servers in the replication group. The stateful data is maintained within the stateful data repositories within application servers in the replication group unless the identified application server or a proxy determines that another application server should process the request.

In one embodiment, the identified application server determines that another application server should process the request and initiates a process to send the request to the other application server. In another embodiment, the proxy determines that another application server should process the request and sends a message to the other application server to initiate a demand from the first identified application server for the request. The identified application server sends the request either under the identified application server's own initiative or in response to the demand made by the other identified application server for the request. The first identified application server also sends the stateful data from any previous requests to the other identified application server. After processing, the stateful data generated by the other application server is then saved in the stateful data repository of the other application server. The stateful data is deleted from the first identified application server and a command is sent to delete the same stateful data from the other application servers in the replication group.

In another embodiment, the stateful data is migrated by importing the stateful data into a stateful data repository residing within a proxy. The imported stateful data is then added to all subsequent requests and any stateful data generated from subsequent requests is also imported into the stateful data repository within the proxy. In another embodiment, the stateful data is migrated by saving the stateful data in some other shared medium. All application servers within the system use the stateful data stored in the shared medium to process client requests.

The illustrative embodiments described herein have several advantages over known methods of sharing stateful data. For example, a façade layer can be avoided, thereby reducing the processing overhead required to handle complex transactions on complex business data processing systems. The method and devices described herein improve upon the façade layer design by implementing various methods of migrating stateful data to different application servers. For example, TCP forwarding can be used to bypass method has the advantages of avoiding unnecessary read/write commands and unnecessary network traffic.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a request for processing in a partitioned application server environment, the partitioned application server environment including a plurality of application partitions, each application partition designated to handle a subset of application requests from clients for the application by application rules, the computer implemented method comprising:
    receiving a request from a client at the partitioned application server environment to form a received request;
    identifying an application partition of the plurality of application partitions in the partitioned application server environment based on the received request to handle the request based on content of the request in view of the application rules;
    sending the received request to the identified application partition;
    migrating stateful data for use by application partitions in the plurality of application partitions to service the request;
    recording an affinity between the client and the first identified application partition;
    receiving a second received request from the client in the first identified application partition;
    identifying in the first identified application partition that a second application partition in the plurality of application partitions is to process the second received request based on the content of the second received request, wherein the second application partition is designated in the application rules to handle the content of the second received request;
    forwarding the second received request to the second identified application partition;
    forwarding the stateful data from the first request to the second identified application partition;
    deleting the stateful data from the first request from the stateful data repository in the first identified application partition;
    communicating a command to delete the copy of the replicated stateful data in each of the plurality of application partitions in a replication group to which the plurality of application partitions belong; and
    updating the affinity to reflect an affinity between the client and the second identified application partition.

2. The computer implemented method of claim 1, wherein identifying that the second application partition is to process the second received request comprises receiving a demand from the second identified application partition for the second received request at the first identified application partition.

3. The computer implemented method of claim 1, wherein the step of migrating stateful data for use by application partitions in the plurality of application partitions further comprises:
    importing the stateful data into a stateful data repository residing within a proxy of the application server environment.

4. The computer implemented method of claim 3, wherein the received request is a first received request, and wherein the method further comprises:
    receiving a second received request from the client at the partitioned application server environment;
    adding the stateful data that was imported into the stateful data repository to the second received request; and
    importing the stateful data generated from the second received request into the stateful data repository residing within the proxy.

5. The computer implemented method of claim 1, wherein the step of migrating stateful data for use by application partitions in the plurality of application partitions further comprises:
    saving the stateful data generated from processing the identified request to a shared medium.

6. A system for managing a request for processing in a partitioned application server environment, the system comprising:
    a data processing system receiving a request from a client to form a received request;
    an application partition in a plurality of application partitions identified to process the received request to form an identified application partitions, wherein each of the plurality of application partitions are each designated to handle a subset of requests relating to the application based on content of the requests, and wherein the data processing system sends the received request to the identified application partition according to the application rules and based on content of the received request, wherein the plurality of application partitions is organized into a replication group;
    a device which migrates stateful data for use by application partitions in the plurality of application partitions, wherein the device is a stateful data repository within the identified application partition;

a replication cache residing in the replication group for replicating the stateful data saved in the stateful data repository in the identified application partition, wherein a copy of the replicated stateful data is sent to each of the plurality of application partitions in the replication group; and a stateful data repository within the each of the plurality of application partitions, wherein the stateful data repository saves a copy of the replicated stateful data.

7. The system of claim 6, wherein the request is a first received request, and wherein the identified application partition is a first identified application partition, and wherein the system further comprises:

a header within a response to the first request for recording the affinity between the client and the first identified application partition; and a second identified application partition in the plurality of application partitions, wherein the first identified application partition receives a second received request, and wherein the second identified application partition is identified by the first identified application partition to process the second received request in accordance with the application rules and based on content of the second received request, and wherein the first identified application partition forwards the second received request to the second identified application partition, and wherein the first identified application partition forwards the stateful data saved in the stateful data repository in the first identified application partition to the second received request, and wherein the first identified application partition deletes the stateful data from the first request from the stateful data repository in the first identified application partition, and wherein the first identified application partition communicates a command to delete the copy of the replicated stateful data in each of the plurality of application partitions in the replication group, and wherein the affinity is updated to reflect an affinity between the client and the second identified application partition.

8. The system of claim 6, wherein the request is a first received request, and wherein the identified application partition is a first identified application partition, and wherein the system further comprises:

a header within a response to the first request for recording the affinity between the client and the first identified application partition; and a second identified application partition in the plurality of application partitions, wherein the first identified application partition receives a second received request, and wherein the first identified application partition receives a demand from the second identified application partition for the second received request, and wherein the first identified application partition forwards the second received request to the second identified application partition in accordance with the application rules, and wherein the first identified application partition forwards the stateful data saved in the stateful data repository in the first identified application partition to the second received request, and wherein the first identified application partition deletes the stateful data from the first request from the stateful data repository in the first identified application partition, and wherein the first identified application partition communicates a command to delete the copy of the replicated stateful data in each of the plurality of application partitions in the replication group, and wherein the affinity is updated to reflect an affinity between the client and the second identified application-partition.

9. The system of claim 6, wherein the device is a proxy which imports the stateful data into a stateful data repository residing within the proxy.

10. The system of claim 9, wherein the received request is a first received request, and wherein the data processing system receives a second request from the client, and wherein the stateful data repository in the proxy adds the stateful data that was imported into the stateful data repository to the second received request, and wherein the stateful data repository imports the stateful data generated from the second received request.

11. The system of claim 6, wherein the device is a shared medium for saving the stateful data generated from processing the identified request.

12. A computer program product comprising a computer readable tangible storage medium containing computer useable instruction code for execution by at least one processor for managing a request for processing in a partitioned application server environment, the computer code comprising:

computer useable instruction code operable by the at least one processor to receive a request from a client at the partitioned application server environment to form a received request;

computer useable instruction code operable by the at least one processor to identify an application partition in a plurality of application partitions in the partitioned application server environment based on the request to form an identified application partition, wherein each of the plurality of application partitions is designated to handle a different subset of requests relating to an application;

computer useable instruction code operable by the at least one processor to send the received request to the identified application partition; and computer useable instruction code operable by the at least one processor to migrate stateful data for use by application partitions in the plurality of application partitions the computer useable instruction code operable by the at least one processor to migrate stateful data for use by application partitions in the plurality of application partitions further comprising:

computer useable instruction code operable by the at least one processor to save the stateful data in a stateful data repository within the identified application partition, wherein the identified application partition is one of the plurality of application partitions in the replication group;

computer useable instruction code operable by the at least one processor to replicate the stateful data saved in the stateful data repository using a replication cache;

computer useable instruction code operable by the at least one processor to send a copy of the replicated stateful data to each of the plurality of application partitions in the replication group; and computer useable instruction code operable by the at least one processor to save a copy of the replicated stateful data in the stateful data repository of the each of the plurality of application partitions in the replication group.

13. The computer program product of claim 12, wherein when the request is a first received request, and wherein when the identified application partition is a first identified application partition, and wherein the computer program product further comprises:

computer useable instruction code operable by the at least one processor to record an affinity between the client and the first identified application partition;

computer useable instruction code operable by the at least one processor to receive a second received request from the client in the first identified application partition;

computer useable instruction code operable by the at least one processor to receive a demand from a second identified application partition for the second received request;

computer useable instruction code operable by the at least one processor to forward the second received request to the second identified application partition;

computer useable instruction code operable by the at least one processor to forward the stateful data from the first request to the second identified application partition;

computer useable instruction code operable by the at least one processor to delete the stateful data from the first request from the stateful data repository in the first identified application partition;

computer useable instruction code operable by the at least one processor to communicate a command to delete the copy of the replicated stateful data in each of the plurality of application partitions in the replication group; and computer useable instruction code operable by the at least one processor to update the affinity to reflect an affinity between the client and the second identified application partition.

14. The computer program product of claim 12, wherein the computer useable instruction code operable by the at least one processor to migrate stateful data for use by application partitions in the plurality of application partitions further comprises:

computer useable instruction code operable by the at least one processor to import the stateful data into a stateful data repository residing within a proxy.

15. The computer program product of claim 14, wherein when the received request is a first received request, the computer program product further comprises:

computer useable instruction code operable by the at least one processor to receive a second received request from the client at the partitioned application server environment;

computer useable instruction code operable by the at least one processor to add the stateful data imported into the stateful data repository to the second request; and computer useable instruction code operable by the at least one processor to import the stateful data generated from the second received request into the stateful data repository residing within the proxy.

16. The computer program product of claim 12, wherein the computer useable instruction code operable by the at least one processor to migrate stateful data for use by application partitions in the plurality of application partitions further comprises:

computer useable instruction code operable by the at least one processor to save the stateful data generated from processing the identified request to a shared medium.

* * * * *